United States Patent
Nakayama et al.

(10) Patent No.: US 7,499,592 B2
(45) Date of Patent: Mar. 3, 2009

(54) IMAGE DECODING APPARATUS AND ITS CONTROL METHOD

(75) Inventors: Tadayoshi Nakayama, Tokyo (JP); Hiroki Kishi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 11/152,053

(22) Filed: Jun. 15, 2005

(65) Prior Publication Data

US 2005/0276501 A1  Dec. 15, 2005

(30) Foreign Application Priority Data

Jun. 15, 2004  (JP) ............................. 2004-177346
Jun. 15, 2004  (JP) ............................. 2004-177348

(51) Int. Cl.
*G06K 9/36*  (2006.01)
(52) U.S. Cl. ..................................... 382/233
(58) Field of Classification Search ......... 382/232–233, 382/238–239, 244–253; 358/426.01–426.04, 358/426.06–426.08, 426.11–426.16
See application file for complete search history.

(56) References Cited

U.S. PATENT DOCUMENTS

| | | | |
|---|---|---|---|
| 5,440,404 A | 8/1995 | Okamoto | 358/432 |
| 5,689,346 A * | 11/1997 | Noda et al. | 358/426.11 |
| 5,850,484 A * | 12/1998 | Beretta et al. | 382/250 |
| 5,883,979 A * | 3/1999 | Beretta et al. | 382/251 |
| 5,999,657 A * | 12/1999 | Yasuhiko | 382/248 |
| 6,259,741 B1 | 7/2001 | Chen et al. | 375/240.26 |

OTHER PUBLICATIONS

"Information Technology—Digital Compression and Coding of Continuous-Tone Still Images—Requirements and Guidelines", ITU-T Recommendation T.81 (ISO/IEC 10918-1), pp. 1-49, Sep. 1992.

* cited by examiner

*Primary Examiner*—Jose L Couso
(74) *Attorney, Agent, or Firm*—Fitzpatrick, Cella, Harper & Scinto

(57) ABSTRACT

This invention improves the arithmetic precision even for image data in which each component of one pixel is expressed by 8 bits by fully utilizing the 12-bit data processing performance of an Extended sequential DCT-based JPEG decoding/encoding apparatus, so that image deterioration due to JPEG compression which is observed in an image portion where the gray levels change slowly, i.e., a pseudo edge can be hardly generated, thus improving the image quality. To this end, a header interpreter interprets the header of encoded data to be decoded to determine if the encoded data is that of 8-bit image data per component or that of 12-bit image data per component, and outputs the result to a bit shift unit, rounding processor, and inverse quantizer. Upon reception of a message indicating that the encoded data is that of 8-bit color image data per component, the bit shift unit stores a result obtained by shifting a quantization step of a quantization table stored in the header by 4 bits in the MSB direction in a quantization table storage unit. The inverse quantizer multiplies a decoded value decoded by a Huffman decoder by the quantization step stored in the quantization table storage unit to generate 12-bit DCT coefficients. The DCT coefficients are processed by an IDCT unit to obtain image data, and the image data is rounded to 8 bits again, thus outputting image data as a decoded result.

8 Claims, 12 Drawing Sheets

IMAGE DECODING APPARATUS AND ITS CONTROL METHOD

FIELD OF THE INVENTION

The present invention relates to a decoding technique of encoded image data.

BACKGROUND OF THE INVENTION

In JPEG as an international standard encoding scheme of still image data, encoding/decoding processes gof color image data of 8 bits per component and color image data of 12 bits per component are specified as a lossy encoding scheme using discrete cosine transformation (DCT). Encoding of an 8-bit image is classified as a Baseline process, and that of a 12-bit image, including 8-bit image, is classified as an Extended DCT-based process. This is specified in a reference "ITU-T recommendation T.81 (ISO/IEC 10918-1)".

Table B.2 in Section B.2.2. of Annex B of this reference specifies the sizes and values of frame header parameters. Also, the numbers of bits to be encoded/decoded are specified as the second parameter P. Baseline sequential DCT, i.e. the Baseline process is limited to an 8-bit image, and the Extended DCT-based process including Extended sequential DCT and progressive DCT can encode/decode 8- and 12-bit images. The number of encoded bits in image data is described in the frame header parameter, and a decoding process is done based on the parameter upon decoding. Hence, the number of encoded bits is equal to the number of bits of image data after decoding for both of 8- and 12-bit images.

A color image input device used so far generates data with a precision of 8 bits or less per component in terms of technical problems and cost, and JPEG compression normally indicates baseline JPEG that compresses 8-bit data.

In recent years, along with the improvement of the precision of an image input device, a digital camera, scanner, and the like can easily generate image data with a precision exceeding 8 bits. Hence, the necessity of Extended sequential DCT-based JPEG that can compress 12-bit data is increasing accordingly.

A major difference between Extended sequential DCT-based JPEG and baseline JPEG is that the number of bits of input data is increased by 4 bits, and is extended so that a color converter, DCT transformer, and quantizer can process 16-fold values.

In an encoding/decoding apparatus that executes a JPEG encoding/decoding process using a dedicated circuit, it is indispensable to introduce an Extended sequential DCT-based JPEG encoder/decoder that can compress/decompress 12-bit data.

When conventional baseline JPEG encoded data is to be decoded using the introduced Extended sequential DCT-based JPEG encoder/decoder, it is a common practice to extract quantization table information included in a header of JPEG encoded data, to execute an inverse quantization process on the basis of the quantization table, and then to execute an inverse DCT process and color conversion process.

FIG. 10 shows the block arrangement of a general decoding apparatus, and its decoding process will be described below.

Referring to FIG. 10, reference numeral 1101 denotes externally input baseline JPEG encoded data; 1103, a header interpreter; 1105, a quantization table storage unit; 1107, a Huffman decoder; 1109, an inverse quantizer; 1111, an inverse DCT unit; 1113, a color converter; and 1115, decoded color image data of 8 bits per component.

The header interpreter 1103 interprets header information of the baseline JPEG encoded data 1101 to extract quantization table information in the header, and stores a quantization step value in the quantization table information in the quantization table storage unit 1105 intact.

On the other hand, Huffman-encoded codes in the baseline JPEG encoded data 1101 are decoded by the Huffman decoder 1107, and quantization values of decoded DCT coefficients are sent to the inverse quantizer 1109.

The inverse quantizer 1109 multiplies the DCT coefficient quantization values by the quantization step value read out from the quantization table storage unit 1105 to restore the quantization values to DCT coefficients, and sends the DCT coefficients to the inverse DCT unit 1111.

The inverse DCT unit 1111 restores the DCT coefficients to real space data, and transfers the data to the color converter 1113. The color converter 1113 performs conversion from YCbCr as luminance and color difference signals into RGB as three primary colors. This color conversion normally uses following formulas (1) that comply with ITU-R BT.601:

$$R = Y + ((Cr-k) \times 1.4020)$$

$$G = Y - ((Cb-k) \times 0.3441) - ((Cr-k) \times 0.7139)$$

$$B = Y + ((Cb-k) \times 1.7718) \tag{1}$$

Note that a value k=128 is used in 8-bit data conversion. With the above color conversion, RGB data of 8 bits per color is reclaimed.

Paying attention to an apparatus having an Extended sequential DCT-based JPEG decoding function, when baseline JPEG encoded data is to be decoded, the upper 4 bits in 12 bits are set to be zero, and real data is set in the lower 8 bits upon arithmetic operations. Hence, the processing contents are the same as those in a decoder that supports baseline JPEG, and no problem is basically posed.

However, since the apparatus itself has processing performance of 12-bit data, the following problem is posed in terms of the improvement of arithmetic precision by means of effective use of a decoding processor which is extended in an upper bit direction.

When an encoding/decoding process of 8-bit data is executed using an Extended sequential DCT-based JPEG encoder/decoder which can compress/decompress 12-bit data, the same processing method as in the conventional baseline JPEG cannot effectively use 12-bit arithmetic hardware, and image quality cannot be improved due to the improvement of arithmetic precision. Also, deterioration of image quality due to repetition of decompression and re-compression cannot be suppressed.

On the other hand, a demand for higher image quality is increasing currently, and vendors are beginning to develop devices which can process multi-bit data over 8 bits so as to attain higher image quality of the devices. For example, some products of digital cameras and scanners can easily generate image data with a precision over 8 bits per color component.

When an image input device inputs each color component with a multi-bit precision exceeding 8 bits, and an image output device outputs an image with an 8-bit precision, a bit rounding process is required. When the image output device receives only data with an 8-bit precision, the image input device must convert input data into 8-bit data and output the converted data. In this case, the image input device temporarily converts input multi-bit data into 8-bit data, applies an image compression process to the 8-bit data, and outputs the compressed data to the output device. However, the multi-bit input function of the image input device is not effectively used; it becomes useless in practice.

SUMMARY OF THE INVENTION

It is an object of the present invention to provide a technique which can fully utilize the function of an Extended sequential DCT-based JPEG encoding/decoding apparatus, and decodes baseline JPEG data with a high precision. It is another object of the present invention to provide a technique which generates a high-precision, high-quality decoded image while compression-encoding image data to be transferred from an image input device to an image output device.

In order to achieve the above objects, for example, an image decoding apparatus of the present invention comprises the following arrangement. That is, there is provided an image decoding apparatus having a function of decoding Extended sequential DCT-based JPEG encoded data, comprising:

determination means for determining by analyzing header information of encoding data if the encoded data is baseline JPEG encoded data or Extended sequential DCT-based JPEG encoded data;

decoding means for decoding the encoded data;

calculation means for, when the determination means determines that the encoded data is baseline JPEG encoded data, calculating inverse quantization data X by:

$$X = D \times Q \times 2^n$$

(n is an integer not less than 1 and not more than 4)

where D is a decoded value decoded by the decoding means, Q is a quantization step value of quantization table information included in the header information of the encoded data, and X is inverse quantization data;

inverse DCT transformation means for performing inverse DCT transformation of the inverse quantization data X obtained by the calculation means; and output means for, when the determination means determines that the input encoded data is baseline JPEG encoded data, applying a rounding process to image data after the inverse DCT transformation and outputting the processed image data, and for, when the determination means determines that the input encoded data is Extended sequential DCT-based JPEG encoded data, outputting image data after the inverse DCT transformation as a decoded result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments according to the present invention will be described in detail hereinafter with reference to the accompanying drawings.

First Embodiment

Figure 11:
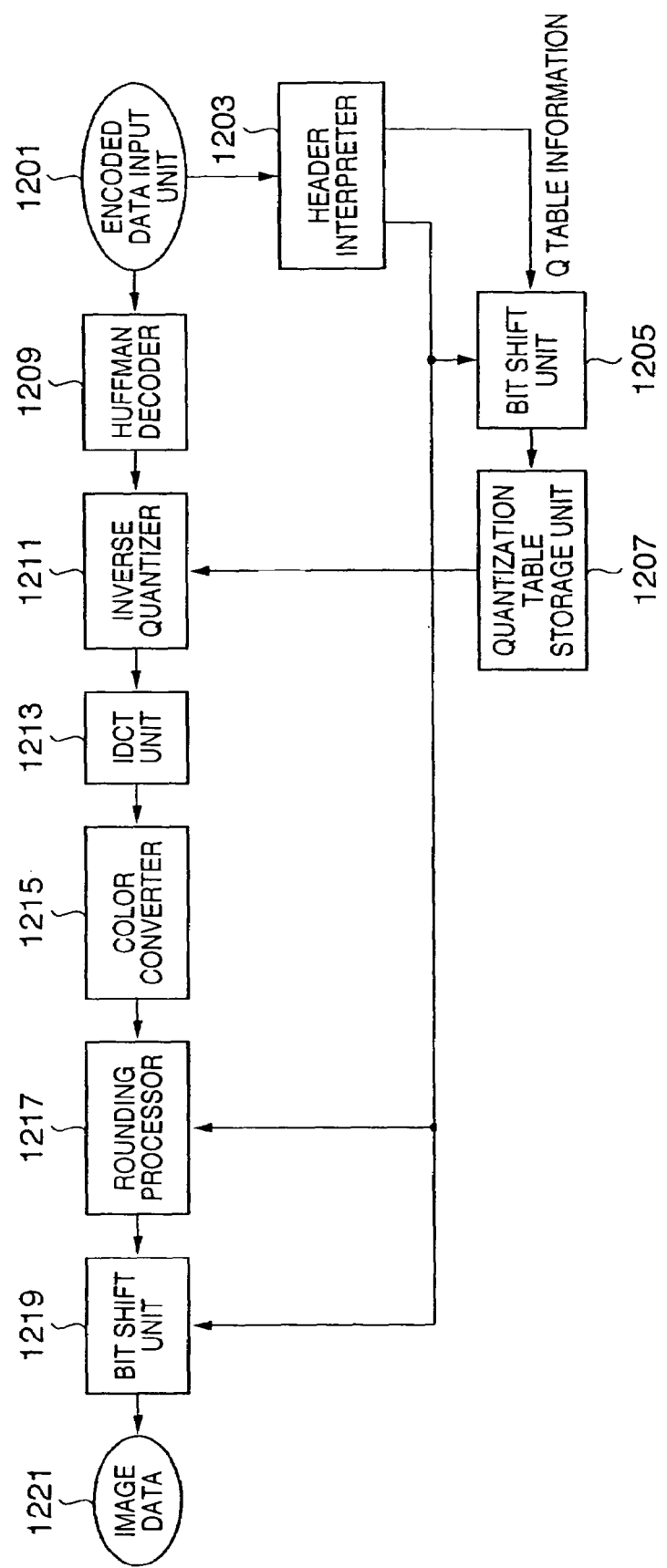
FIG. 11 is a block diagram showing the arrangement of a decoding apparatus according to the first embodiment.

FIG. 11 is a block diagram of an image decoding apparatus which decodes both baseline JPEG data and Extended sequential DCT-based JPEG data in this embodiment.

Referring to FIG. 11, reference numeral 1201 denotes an encoded data input unit which is a device for accessing a storage medium such as a memory card or the like when an input source is the storage medium, or a network interface when an encoded image data file on the network is to be input. That is, the type of input unit is not particularly limited.

Reference numeral 1203 denotes a header interpreter which interprets a frame start marker ($SOF_0$ marker) of a head of the input encoded data to check if the input encoded data is encoded data of color image data which is expressed by 8 bits per color (each color component which forms one pixel) (to be referred to as baseline JPEG encoded data hereinafter) or encoded data of color image data which is expressed by 12 bits per color (each color component which forms one pixel (to be referred to as Extended sequential DCT-based JPEG encoded data hereinafter). The header interpreter 1203 outputs the result, and extracts quantization table information (Q table information) stored in the header.

Reference numeral 1205 denotes a bit shift unit. Upon reception of a message indicating that the data to be decoded is baseline JPEG encoded data from the header interpreter 1203, the bit shift unit 1205 shifts (multiplies by 16) a quantization step indicated by the quantization table information output from the header interpreter 1203 by 4 bits to the left (MSB side), and stores the result in a quantization table storage unit 1207. In case of Extended sequential DCT-based JPEG encoded data, the bit shift unit 1205 skips the bit shift process, and stores input quantization table information in the quantization table storage unit 1207 intact.

Reference numeral 1209 denotes a Huffman decoder which decodes Huffman codes in the input encoded data. Reference numeral 1211 denotes an inverse quantizer which multiplies numerical values decoded by the Huffman decoder 1209 by the quantization step stored in the quantization table storage unit 1207 to restore DCT transformation coefficients (DCT-transformed results).

Reference numeral 1213 denotes an inverse DCT (IDCT) unit which calculates coefficients with a precision of 12 bits or more internally (including bits after the decimal point).

Reference numeral 1215 denotes a color converter which converts image data expressed by YCbCr components, i.e., luminance and color difference components obtained by the IDCT unit 1213 into a color space expressed by R, G, and B color components. The arithmetic precision in this conversion is at least 12 bits or more including bits after the decimal point.

Note that this color conversion is a function equipped under the assumption that JPEG compression encoding normally is performed in the state of luminance and color difference components, and data is finally used in an RGB color space. However, if the apparatus need only directly output luminance and color difference components, color conversion need not be executed. In such case, the subsequent processes are done using luminance and color difference components.

Reference numeral 1217 denotes a rounding processor which executes a rounding process of predetermined lower bits on the basis of the checking result of the header interpreter 1203. Reference numeral 1219 denotes a bit shift unit which sets the regular number of bits as image data 1221 on the basis of the checking result of the header interpreter 1203. In case of Extended sequential DCT-based JPEG encoded data, the rounding processor 1217 rounds off bit data after the decimal point, and outputs 12 bits as an integer part intact. The bit shift unit 1219 skips the bit shift process, and outputs image data of 12 bits per color (component).

In the above arrangement, when the header interpreter 1203 determines that encoded data to be decoded is Extended sequential DCT-based JPEG encoded data, quantization table information included in the header is stored in the quantization table storage unit 1207 intact, and the inverse quantizer 1211, IDCT unit 1213, and color converter 1215 perform an Extended sequential DCT-based JPEG data decoding process. The rounding processor 1211 rounds respective components to 12 bits, and the bit shift unit 1219 skips the bit shift process, thus outputting data of 12 bits per color (component).

Note that YCbCr→RGB conversion to be made by the color converter 1215 uses formulas (1) which comply with ITU-R BT.601. Since k=128 in the 8-bit arithmetic operations, the 12-bit arithmetic operations require its 16-fold value (a 4-bit shifted value in the MSB direction), i.e., k=2048 upon processing.

On the other hand, in case of baseline JPEG encoded data, since the respective processing units of this embodiment have arithmetic performance of 12 bits or more, an 8-bit→12-bit extension process is performed by utilizing such performance to execute the same process as in the decoding process of Extended sequential DCT-based JPEG encoded data. Hence, inverse quantization, IDCT, and color conversion are made with a high precision.

To this end, when the header interpreter 1203 interprets a marker in the header of the input encoded data, and determines that the data to be decoded is baseline JPEG data, it multiplies the quantization step of the quantization table by 16 (shifts it by 4 bits in the MSB direction), and stores the result in the quantization table storage unit 1207. The inverse quantizer 1211 inversely quantizes data obtained from the Huffman decoder 1209 using the 16-fold quantization step. After that, the IDCT unit 1213 and color converter 1215 execute 12-bit processes (k=2048).

In this case, since 12-bit data is output as the decoded result, the rounding processor 1217 executes a rounding process of 4 bits (bits 0 to 3) from the LSB in an integer part (12 bits) obtained by the color converter. More specifically, since 4 bits can express a value ranging from 0 to 15, the lowermost 4 bits are checked using its central value "8" as a threshold. If a value expressed by the lower 4 bits is less than "8", all the lower 4 bits are set to be zero; if that value is equal to or larger than "8", "1" is added to the fifth bit (bit 4) from the LSB. The bit shift unit 1219 shifts (multiplies by 1/16) the 12-bit data by 4 bits to the right (to the LSB), thus generating regular 8-bit data.

As described above, according to this embodiment, baseline JPEG encoded data can be decoded with a high precision by fully utilizing the apparatus that can decode Extended sequential DCT-based JPEG encoded data.

In this embodiment, when baseline JPEG encoded data generated by encoding 8-bit data is to be decoded, quantization table information in the header is multiplied by 16, and is then stored in the quantization table storage unit 1207. However, the present invention is not limited to such specific method, and the following two processing methods can be used:

1. a method of storing the quantization table information in the header in the quantization table storage unit 1207 intact, and multiplying it by 16 after it is read out from the storage unit; and
2. a method of storing the quantization table information in the header in the quantization table storage unit 1207 intact, using the stored table until multiplication in the inverse quantizer 1211, and multiplying it by 16 at the time of output from the inverse quantizer 1211.

All these processes are equivalent, and any other processes may be used as long as DCT coefficients are consequently multiplied by 16.

In this embodiment, DCT coefficients are multiplied by $2^4=16$ but they may be multiplied by $2^3=8$. The values of DCT coefficients have errors due to the quantization process upon encoding and the inverse quantization process upon decoding. These errors depend on the quantization step, and may become larger with increasing quantization step. Also, the values of DCT coefficients may become considerably larger than original values.

For this reason, the intermediate arithmetic results in the inverse DCT process exceed an expected range, and the level is often clipped as a measure taken against such overflow. In order to avoid such clip process, DCT coefficients may be extended to 8- fold in place of 16-fold. As a result, the upper 1 bit can have a margin, and the aforementioned clip process can be avoided.

The decoding apparatus has been explained. An example in which the aforementioned idea of extending the number of bits is applied to an encoding apparatus will be described below. That is, the arithmetic precision can be improved not only on the decoding process side but also on the encoding process side.

Figure 12:
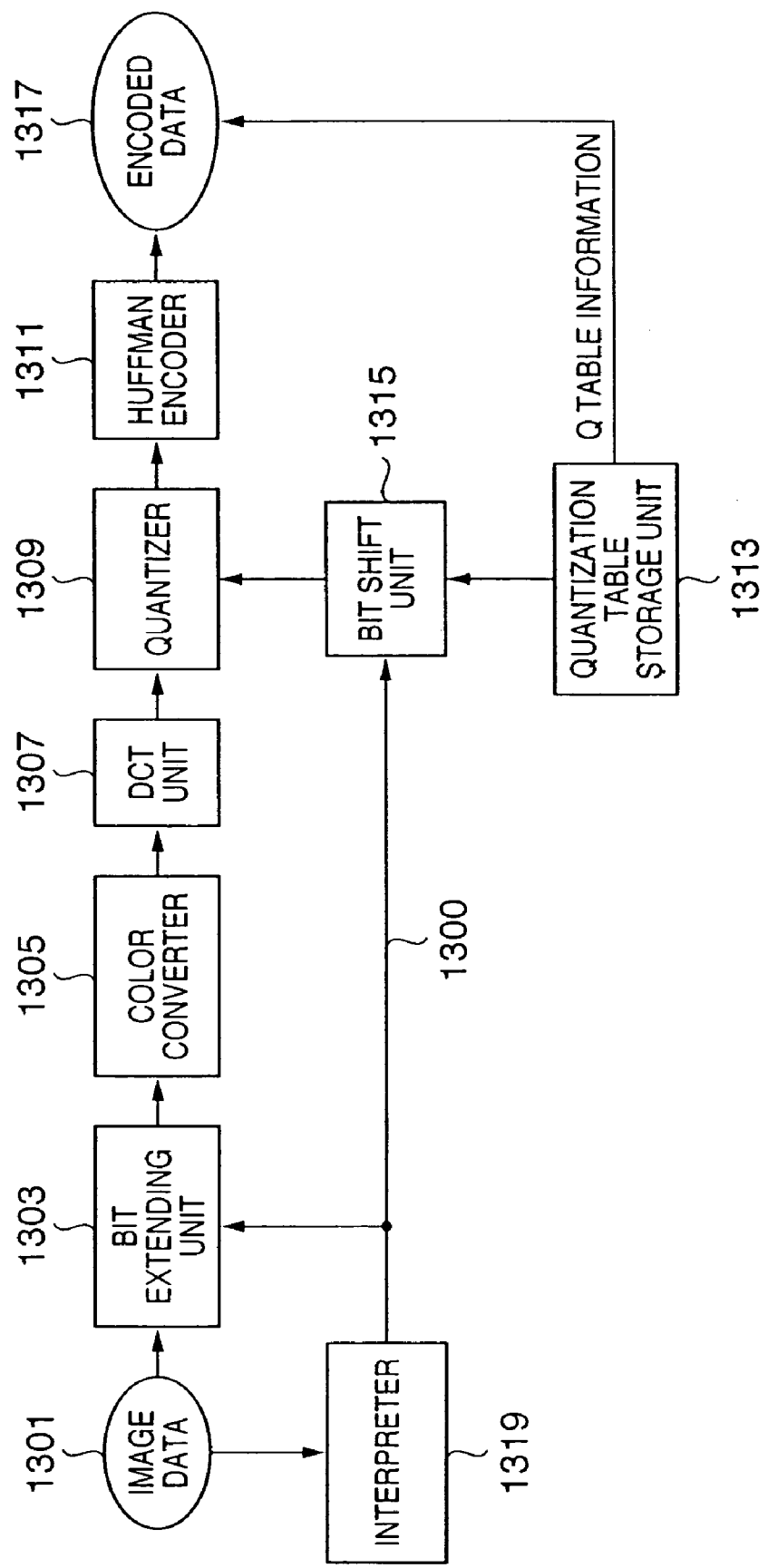
FIG. 12 is a block diagram showing the arrangement of an encoding apparatus according to the first embodiment.

FIG. 12 is a block diagram of an encoding apparatus of this embodiment.

Referring to FIG. 12, reference numeral 1301 denotes input color image data which is expressed by 8- or 12-bit RGB color components. Reference numeral 1303 denotes a bit extending unit. When a control signal 1300 indicates that each color component is expressed by 8 bits, the bit extending unit 1303 shifts each component value by 4 bits ($2^4=16$-fold) to the left (to the MSB). If each color component is expressed by 12 bits, the bit extending unit 1303 skips the shift process.

Reference numeral 1305 denotes a color converter which converts an RGB color space expressed by respective color components into a YCbCr color space expressed by luminance and color difference components (by arithmetic operations of 12 bits or more); 1307, a DCT unit; and 1309, a quantizer. The DCT unit 1307 and quantizer 1309 respectively perform arithmetic operations of at least 12 bits or more. Reference numeral 1311 denotes a Huffman encoding unit.

Reference numeral 1313 denotes a quantization table storage unit which stores quantization step values for 8 and 12 bits.

Reference numeral 1315 denotes a bit shift unit. When the control signal 1300 indicates that each color component is expressed by 8 bits, the bit shift unit 1315 shifts the quantization step value for 8 bits stored in the quantization table storage unit 1313 by 4 bits ($2^4$=16-fold) to the left (to the MSB side). On the other hand, when the control signal 1300 indicates that each color component is expressed by 12 bits, since the quantization step for 12 bits is used, this shift process is skipped.

Reference numeral 1319 denotes an interpreter which outputs the control signal 1300 that indicates if the input color image data is expressed by 8 or 12 bits per color. If the input image data is a file, the interpreter 1319 interprets a header of the file. However, if the input image data is an input from an external device, the control signal 1300 may be generated based on information from control software that controls a communication of an interface.

When each color component (RGB) is expressed by 12 bits, the bit extending unit 1303 allows input image data to pass through, and the color converter 1305 and DCT unit 1307 perform arithmetic operations with a precision of 12 bits or more so as to attain the Extended sequential DCT-based JPEG encoding process.

The color conversion process executed by this unit uses following formulas (2) that comply with ITU-R BT.601:

$$Y=0.299 \times R+0.587 \times G+0.114 \times B$$

$$Cb=(-0.299 \times R-0.587 \times G+0.886 \times B) \times 0.564+k$$

$$Cr=(0.701 \times R-0.587 \times G-0.114 \times B) \times 0.713+k \quad (2)$$

Note that k=2048 is used in formulas (2) since arithmetic operations for 12-bit data are made.

The bit shift unit 1315 allows the quantization step for 12 bits stored in the quantization table storage unit 1313 to pass through. The quantizer 1309 performs quantization, and the Huffman encoding unit 1311 performs entropy encoding, thus finally generating encoded data. At this time, a header of the generated encoded data stores a marker indicating Extended sequential DCT-based JPEG and the quantization table value.

On the other hand, upon executing baseline JPEG encoding, since each color component of input image data is expressed by 8 bits, the bit extending unit 1303 performs 12-bit conversion of that image data (shifts each component value by 4 bits in the MSB direction), and the color converter 1305 and DCT unit 1307 process that image data as 12-bit data. As a result, data output from the DCT unit 1307 is also 12-bit data.

The bit shift unit 1315 shifts the quantization step value from the quantization table storage unit 1313 by 4 bits in the MSB direction, and outputs the result to the quantizer 1309.

The quantizer 1309 quantizes coefficient values output from the DCT unit 1307 by dividing them by the quantization step from the bit shift unit 1315. When the output result of this quantizer 1309 is compared with a case wherein DCT transformation is done by normal 8-bit arithmetic operations and coefficient values are divided by the quantization step value for 8 bits, they have nearly the same values but a slight difference is generated. This difference results from the improvement of arithmetic precision.

The quantized coefficients undergo entropy encoding by the Huffman encoding unit 1311, thus outputting encoded data. At this time, a header of the encoded data stores a marker indicating baseline JPEG encoded data, and the quantization table information for 8 bits before bit shift.

In this embodiment, the quantization step value read out from the quantization table storage unit 1313 undergoes the shift process on the basis of the control signal 1300. Alternatively, the quantization step value to be stored in the quantization table storage unit may be multiplied by 16 in advance on the basis of the control signal 1300. In this case, when the quantization step value is stored in the header of the encoded data, it must be divided by 16.

Encoded data which is obtained by the encoding process of this embodiment can be sent to an external device via the network or the like.

As in the aforementioned decoding process, an 8-bit input upon encoding need not always undergo 12-bit conversion but may undergo 10-bit conversion ($2^2$=4-fold) or 11-bit conversion ($2^3$=8-fold). That is, since an apparatus which has 12-bit arithmetic performance is guaranteed to be able to calculate data of 12 bits or less, encoded data that maintains the baseline JPEG format by normal 8-bit arithmetic operations can be generated by only extending 8-bit data up to a larger number of bits, i.e., 12 bits by multiplying by $2^n$ (n is an integer ranging from 1 to 4), and calculating the extended data, and its decoding process is also allowed. In addition, the arithmetic precision can be improved by converting input data other than 8 bits to 12 bits.

Furthermore, the present invention is not limited to 8 bits per pixel specified by baseline JPEG and 12 bits per pixel specified by Extended sequential DCT-based JPEG, and can be applied to other encoding schemes having relationships similar to them.

As described above, according to this embodiment, the 12-bit data processing performance of the Extended sequential DCT-based JPEG decoding and encoding apparatuses can be effectively utilized even for image data whose component per pixel is expressed by 8 bits. Hence, the arithmetic precision can be improved, and image deterioration due to JPEG compression, which is observed in an image portion where the gray levels change slowly, i.e., a pseudo edge can be hardly generated, thus improving the image quality. Also, deterioration of image quality due to repetition of decompression and re-compression can be minimized.

Second Embodiment

The second embodiment will explain a case wherein image data which is expressed by 16 bits per color component undergoes a JPEG encoding process to obtain an encoded bitstream, and that encoded bitstream is decoded to output an image which is expressed by 8 bits per color component.

Figure 5:
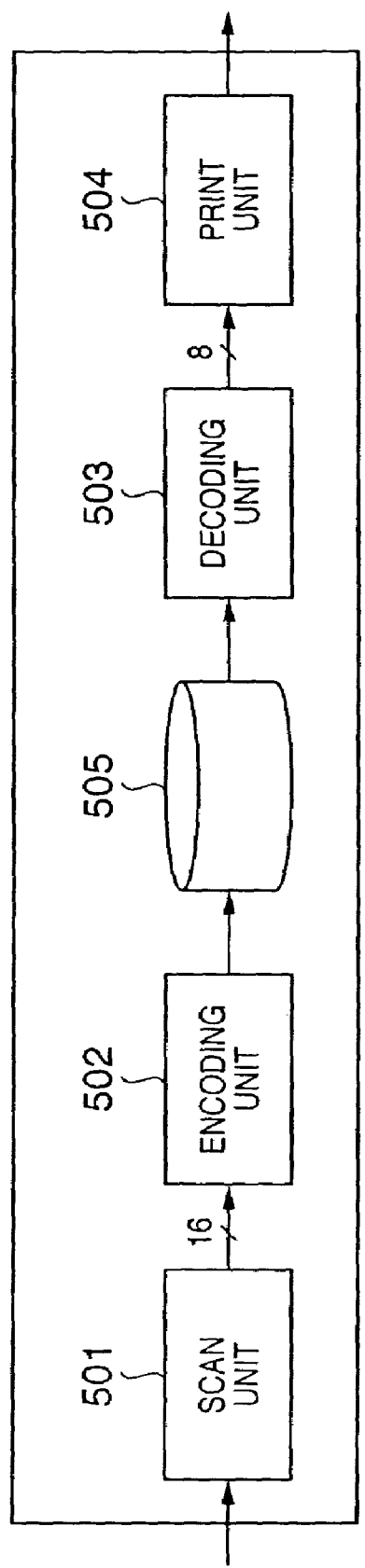
FIG. 5 is a block diagram of the overall apparatus according to the second embodiment.

FIG. 5 is a block diagram of an image processing apparatus (copying machine) to which the second embodiment is applied.

Referring to FIG. 5, reference numeral 501 denotes a scan unit which scans a document image with a precision of 16 bits per color component; 502, an encoding unit; 503, a decoding unit; and 504, a print unit which receives and prints an image which is expressed by 8 bits per color component. Reference numeral 505 denotes a storage device which stores encoded data output from the encoding unit 502. The decoding unit 503 reads out encoded data from the storage device 505 in accordance with the print speed of the print unit 504, and performs a decoding process. As a result, a document scan process and print process can be asynchronously done, and a high-speed document scan process can be achieved. Note that the storage device 505 can comprise a semiconductor memory or a hard disk which has low cost per size, since it need only store a plurality of images.

Figure 1:
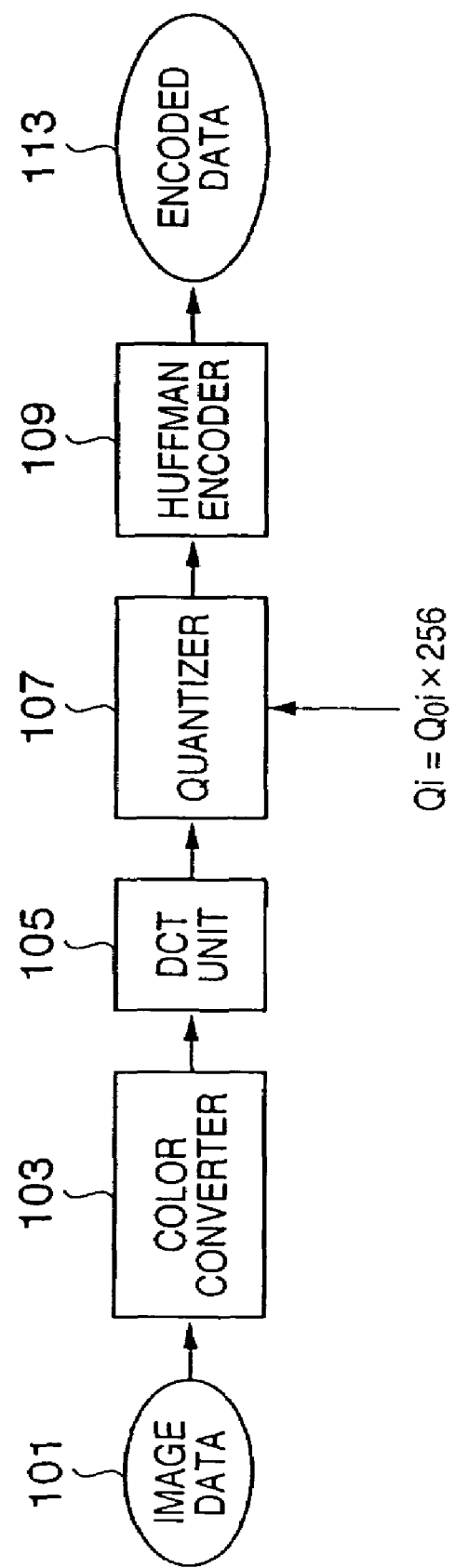
FIG. 1 is a block diagram of an encoding unit according to the second embodiment.

FIG. 1 is a block diagram of the encoding unit 502 in this embodiment.

Referring to FIG. 1, reference numeral 101 denotes full-color image data which is output from the scan unit 501 and is expressed by 16 bits per color component. Reference numeral 103 denotes a color converter which performs RGB→YCbCr color space conversion in the 16-bit range since this embodiment encodes an image from an image scanner by JPEG.

This color conversion is made according to formulas (2) that comply with ITU-R BT.601, and these formulas are described again:

$$Y = 0.299 \times R + 0.587 \times G + 0.114 \times B$$

$$Cb = (-0.299 \times R - 0.587 \times G + 0.886 \times B) \times 0.564 + k$$

$$Cr = (0.701 \times R - 0.587 \times G - 0.114 \times B) \times 0.713 + k \quad (2)$$

Note that k=128 when each color component is expressed by 8 bits. However, in the second embodiment, since each of R, G, and B components is expressed by 16 bits, a value k=32768 is used.

Reference numeral 105 denotes a DCT (orthogonal transformation) unit which also performs orthogonal transformation in the 16-bit range. Reference numeral 107 denotes a quantizer which quantizes coefficients obtained by orthogonal transformation by dividing them by a quantization step; 109, a Huffman encoder; and 113, encoded data generated by the encoding process.

Note that a quantization step Qi in the quantizer 107 is calculated by:

$$Qi = Q_0 i \times 2^{(n-m)}$$

(where x^y indicates the y-th power of x)

Assuming that orthogonal transformation is made every 8×8 pixels, i=0, 1, . . . , 63, and $Q_0i$ is a quantization step value used upon encoding an 8-bit image, n is the number of bits per color component of an input image, and m is the number of bits per color component of a decoded image.

Since this embodiment exemplifies a case wherein each color component is expressed by 16 bits and the decoding unit 503 decodes using 8 bits per color component, n=16 and m=8, and the quantization step value Qi used in the quantizer 107 is given by:

$$Qi = Q_0 i \times 256$$

That is, Qi is also obtained by shifting $Q_0i$ by 8 bits to the left (to the MSB side).

Since the color converter 103 and DCT unit 105 calculate in the 16-bit range, DCT coefficients are divided by Qi, i.e., the 256-fold value of the quantization step $Q_0i$ for an 8-bit image, thus consequently obtaining 8-bit quantization values. Note that the image data 101 which is expressed by 16 bits per color component does not undergo 8-bit conversion before it is input to the color converter 103, but it undergoes 16-bit calculations in the color converter 103 and DCT unit 105. Hence, calculations can be made with higher precision than 8-bit calculations.

The Huffman encoder 109 encodes the quantization values to Huffman codes on the basis of a Huffman table (not shown) to generate the encoded data 113.

Figure 2:
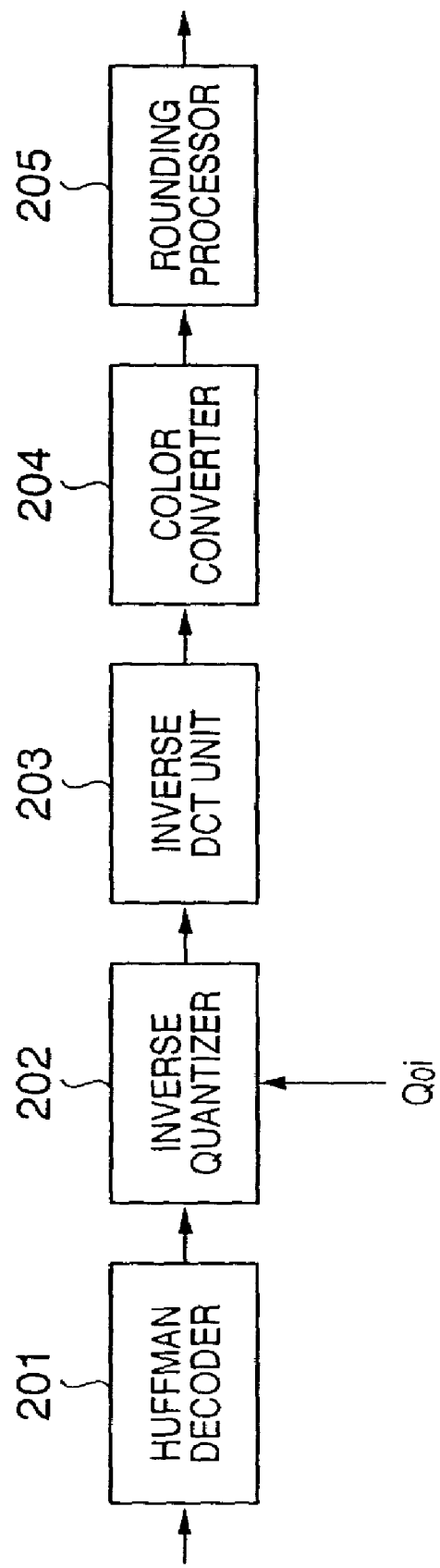
FIG. 2 is a block diagram of a decoding unit according to the second embodiment.

FIG. 2 is a block diagram of the decoding unit 503 in FIG. 5.

Referring to FIG. 2, reference numeral 201 denotes a Huffman decoder which receives the encoded data in FIG. 1 via the storage device 505, and performs entropy decoding. Reference numeral 202 denotes an inverse quantizer which inversely quantizes entropy-decoded data by the quantization step value $Q_0i$. Reference numeral 203 denotes an inverse DCT unit; 204, an inverse color converter; and 205, a rounding processor.

The Huffman decoder 201 decodes Huffman codes in the received encoded data 113 on the basis of a Huffman table (not shown) to generate quantization values, and transmits the quantization values to the inverse quantizer 202. The inverse quantizer 202 inversely quantizes the quantization values using the quantization step $Q_0i$ to generate DCT coefficients (integer calculations are made until this process). Next, the inverse DCT unit 203 computes inverse DCTs of the obtained DCT coefficients to generate image data of color conversion data YCbCr. The inverse color converter 204 color-converts the color conversion data. In this case, since this embodiment aims at printing, the inverse color converter 204 converts YCbCr data into the YMC color space in place of the RGB color space. The rounding processor 205 applies a rounding process of fractions after the decimal point to density data of the obtained Y, M, and C color components (e.g., by rounding off fractions below the decimal point), thereby generating a recording image.

As a result, upon encoding, all color components R, G, and B are input with a 16-bit precision, and undergo color conversion and DCT transformation. The DCT coefficients are quantized and encoded by the 256-fold value of the quantization step value $Q_0i$ for an 8-bit image. Hence, the arithmetic precision of the color conversion and DCT transformation is twice that for an 8-bit image. Data after quantization has the same format as that obtained upon encoding an 8-bit image, but it does not always have the same value. This is because 16-bit calculations are made up to DCT transformation. Therefore, since arithmetic losses are fewer than 8-bit DCT transformation, higher precision is reflected in data after quantization.

A practical apparatus arrangement and processing sequence in the second embodiment will be described below.

Figure 7:
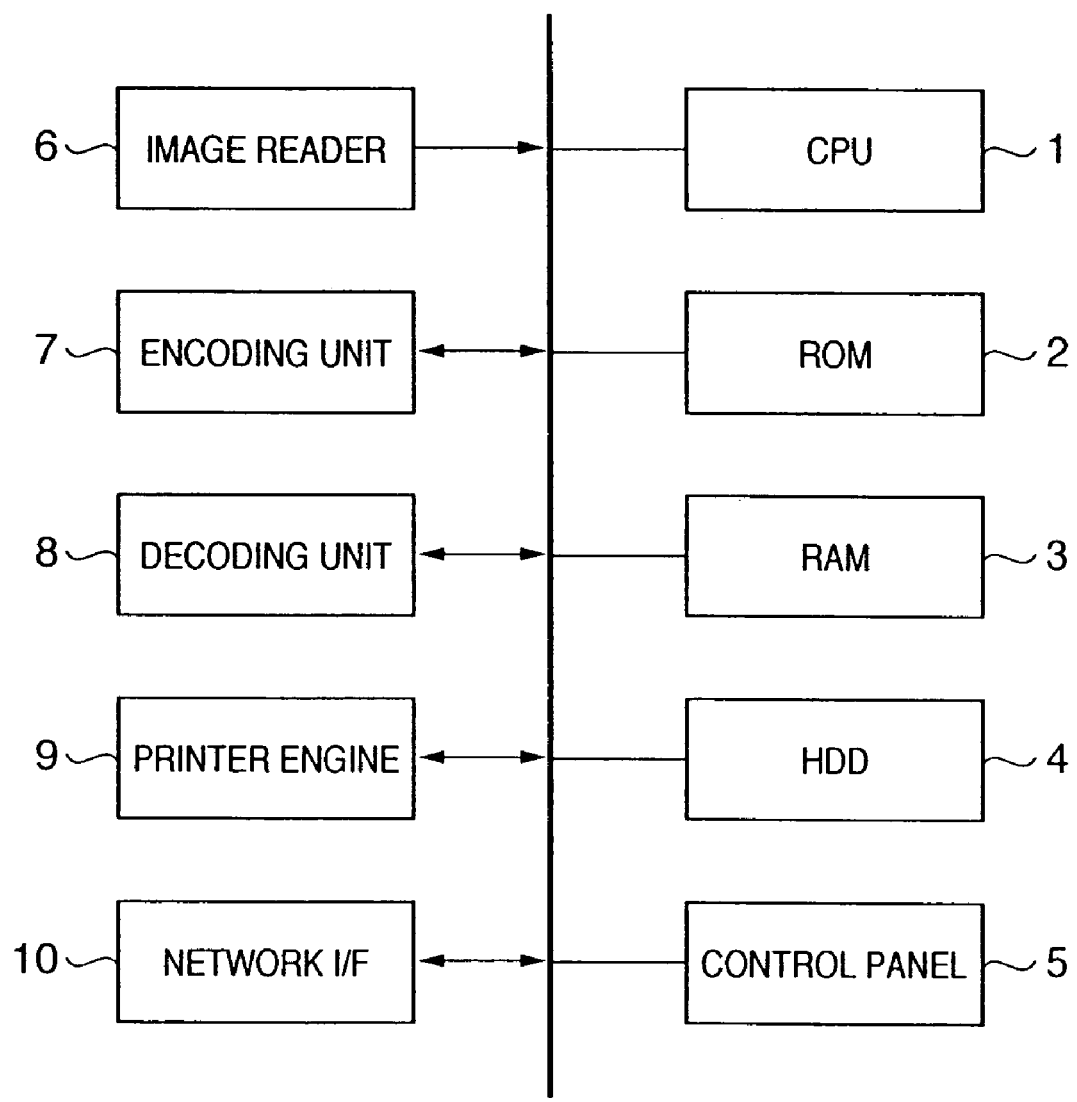
FIG. 7 is a block diagram of a copying machine to which the second embodiment is applied.

FIG. 7 is a block diagram of the copying machine in this embodiment. Referring to FIG. 7, reference numeral 1 denotes a CPU which controls the overall copying machine; 2, a ROM which stores the processing sequence (program); and 3, a RAM which is used as a work area of the CPU 1.

Reference numeral 4 denotes a hard disk drive (HDD) which temporarily stores an image file, and corresponds to the storage device 505 in FIG. 5. Reference numeral 5 denotes a control panel which has a liquid crystal display and various buttons (switches). Reference numeral 6 denotes an image reader which scans a document image. The image reader 6 scans R, G, and B color components with a 16-bit precision. Note that the image reader 6 equips an ADF (auto document feeder) and can scan a plurality of pages of images sequentially.

Reference numeral 7 denotes an encoding unit which encodes an image and corresponds to the encoding unit 502 (FIG. 1) shown in FIG. 5. Reference numeral 8 denotes a decoding unit which corresponds to the decoding unit 503 (FIG. 2) in FIG. 5. Reference numeral 9 denotes a printer engine. As the printer engine 9, an ink-jet printer, laser beam printer, or the like may be used, but its printing system is not particularly limited.

Reference numeral 10 denotes a network interface used to connect the copying machine to the network. With this network interface 10, the copying machine of this embodiment can serve as a network scanner and network printer.

With this arrangement, when a document to be copied is set on the ADF of the image reader 6 (a plurality of documents may be set), and a copy start instruction is input from the control panel 5, the image reader 6 sequentially scans documents with a 16-bit precision for each of R, G, and B color components, and temporarily stores the scan result in the HDD 4 as a file.

The HDD 4 stores image data of respective pages. In this case, the CPU 1 controls the encoding unit 502 to perform compression encoding in turn from a first image file that completes the storage process.

Since the encoding unit 502 has the arrangement shown in FIG. 1, it receives an image file designated by the CPU 1 as the image data 101, and the color converter 103 and DCT unit 105 respectively execute processes in the 16-bit range. The quantizer 107 quantizes using the quantization step Qi as the 256-fold value of the quantization step value $Q_0i$ used upon generating 8-bit encoded data, and the Huffman encoder 109 performs an entropy-encoding process. The encoded result is stored as a baseline JPEG file in the HDD 4. At this time, the original image data (image data of 16 bits per color component) file before encoding has already been processed, and is deleted from the HDD 4.

On the other hand, a print process is executed asynchronously to the aforementioned document scan/encoding process. In this print process, whether or not the compression-encoded file is stored in the HDD 4 is monitored, and if such file is stored, the file undergoes a decoding process. The decoded file undergoes a print process using the printer engine 9, and the printed compression-encoded file is deleted. This process is repeated as long as images to be printed remain.

As a result, the HDD 4 stores scanned images in turn after compression encoding, and the stored compression-encoded image data undergo the decoding process in their storage order to perform the print process. Hence, the HDD 4 does not require any large-size storage area, and a RAM may be used instead in some cases. The aforementioned process will be described below with reference to the flowcharts of FIGS. 8 and 9.

Figure 8:
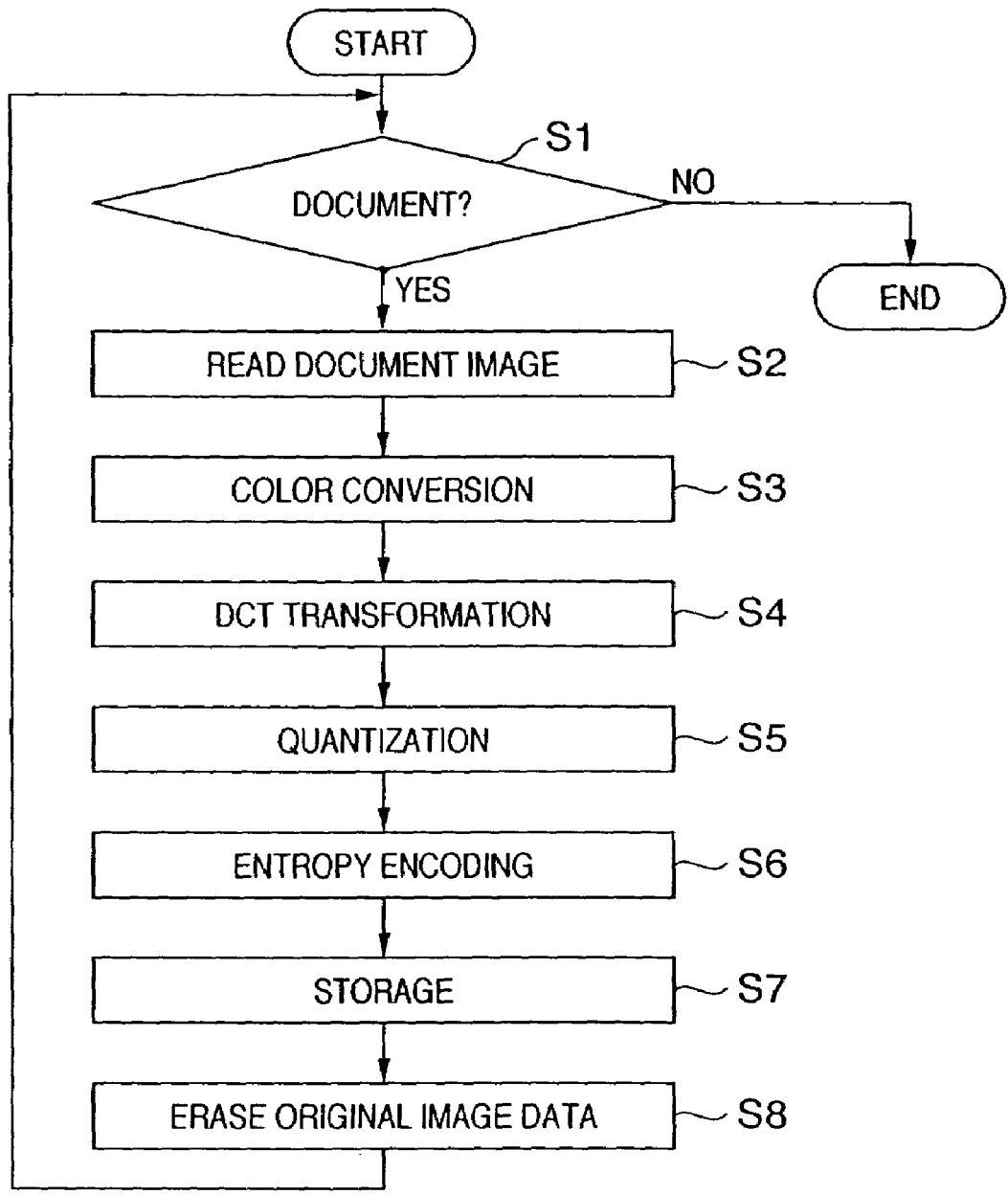
FIG. 8 is a flowchart showing the processing sequence of a document scan process in the second embodiment.

The document scan process upon copying a document will be described below with reference to the flowchart of FIG. 8. This process is launched when a copy start instruction is input from the control panel 5.

It is checked in step S1 if a document is set. This checking process is attained on the basis of a signal from a sensor (not shown) provided to the ADF.

If it is determined that a document is set, one document is fed to the scan surface to scan a document image in step S2. In this case, the document image is scanned with a 16-bit precision for each of R, G, and B color components, and the image data is temporarily stored in the HDD 4. Upon completion of scanning of one image, RGB→YCbCr color conversion is executed in step S3, and DCT transformation is made in step S4. The arithmetic processes in steps S3 and S4 are done in the 16-bit range.

After that, the flow advances to step S6 to perform entropy encoding. In step S7, encoded data is stored in the HDD 4 as a baseline JPEG file (compressed image file). Upon completion of this storage process, since original image data before compression becomes unnecessary, it is deleted (step S8), and the flow returns to step S1. Therefore, when a plurality of documents are set on the ADF and a copy instruction is issued, the processes in steps S2 to S8 are repeated as many as the number of set documents.

Figure 9:
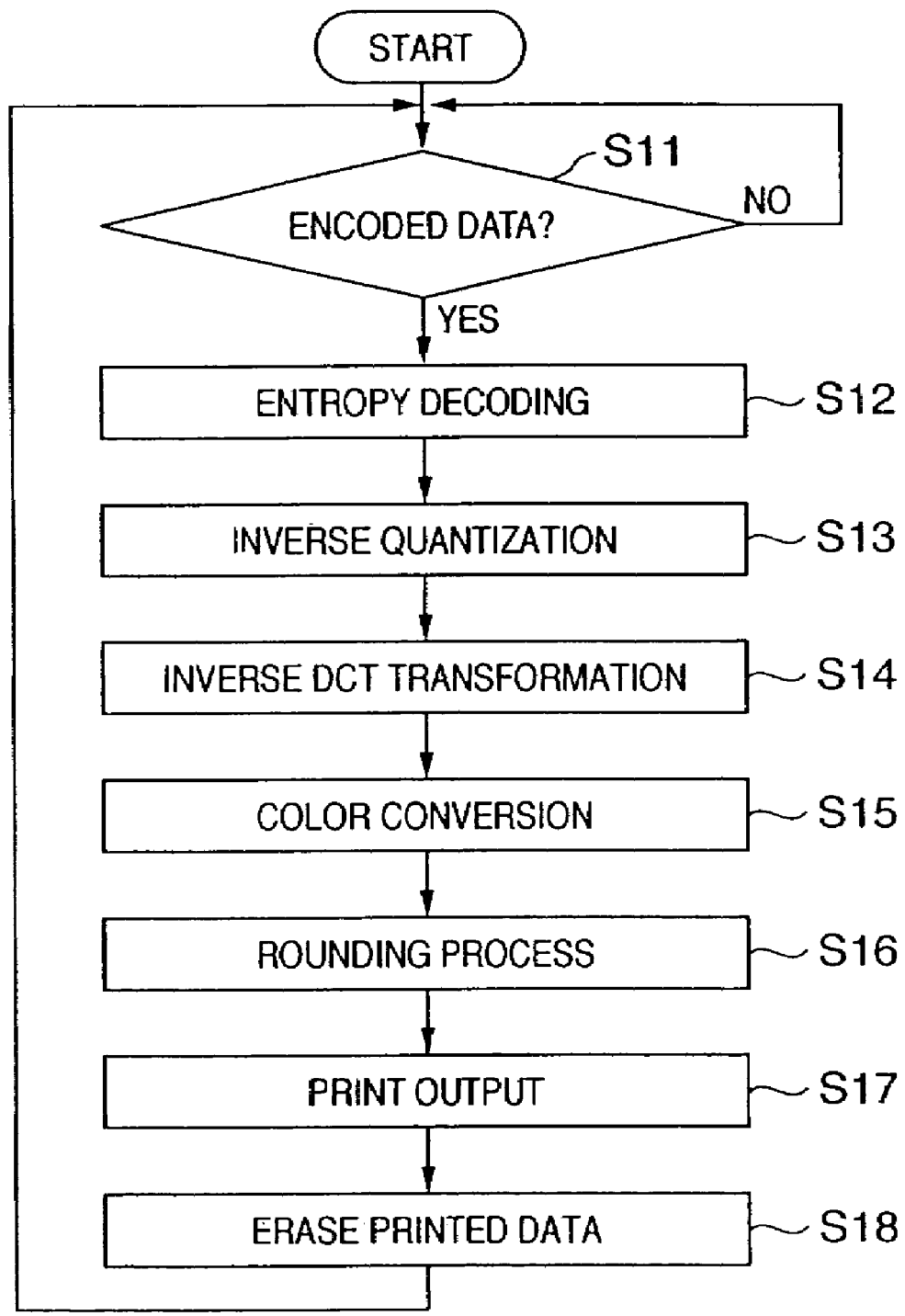
FIG. 9 is a flowchart showing the processing sequence of a print process in the second embodiment.
Figure 10:
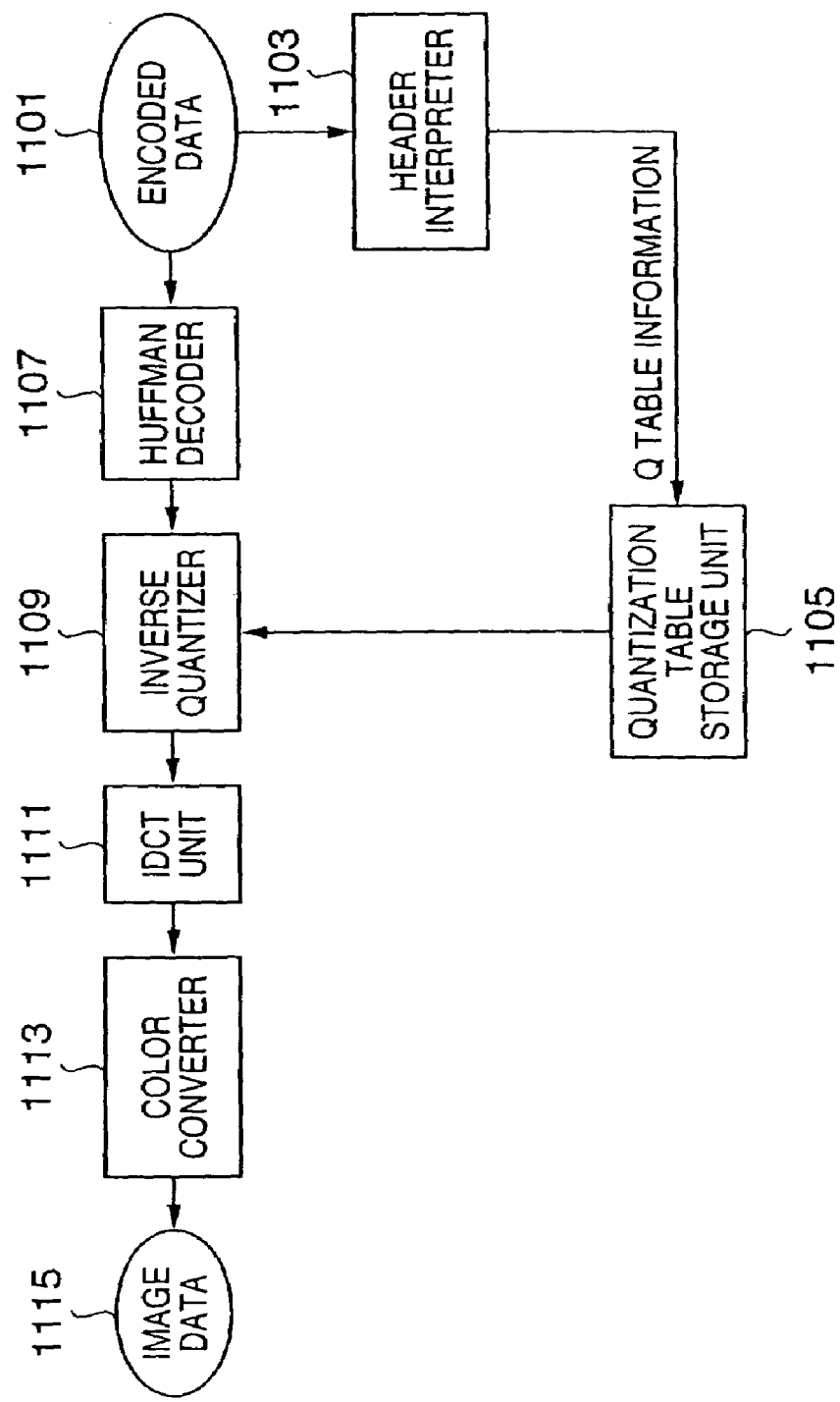
FIG. 10 is a block diagram showing the arrangement of a conventional decoding apparatus.

The print process in this embodiment will be described below with reference to the flowchart of FIG. 9.

It is checked in step S11 if a compressed image file is stored in the HDD 4. The control waits until a compressed image file is stored.

If it is determined that a compressed image file is stored, the flow advances to step S12, and the decoding unit 8 decodes that file. The decoding unit 8 performs entropy decoding first. The decoding unit 8 inversely quantizes the decoded result by multiplying it by the quantization step value $Q_0i$ in step S13. In step S14, the decoding unit 8 performs inverse DCT transformation to obtain image data on the YCbCr color space. Since this embodiment aims at printing out that image, data on the YMC color space (a black component K may be generated by further executing a UCR process in step S15) is generated. In this case, since data includes fractions below the decimal point, a rounding process of fractions below the decimal point (in this embodiment, the first decimal place is rounded off) is executed in step S16. As a result, since Y, M, and C color components (8 bits each) to be printed are generated, they are output to the printer engine 9 at predetermined timings in step S17, thus executing a print process. Upon completion of the print process, since the compressed image file used in that process becomes unnecessary, it is deleted from the HDD 4, and the processes in step S11 and subsequent steps are repeated.

As described above, according to the second embodiment, in an apparatus in which the number of bits of each color component in an image input unit (image reader in this embodiment) is larger than that of an image output unit (printer in this embodiment), encoded data which can be decoded to high-quality image data that fully utilizes the number of bits to be processed by the image input unit can be generated, while standard baseline JPEG encoded data is transferred to the image output unit. Generation of the baseline JPEG encoded data and the rounding process in decoding can be executed once in practice after conversion to the output color space upon decoding.

In the second embodiment, the image reader and printer have been exemplified as the image input and output devices. Alternatively, a digital camera (that can store RAW image data) and a display device may be used as the image input and output devices. Especially, when the display device is adopted as the image output device, the color converter 204 in FIG. 2 need only perform YCbCr→RGB color space conversion. Hence, the output color space is not limited to YMC.

Third Embodiment

In the second embodiment, the number of bits to be processed by the image input device is larger than that to be processed by the image output device.

The third embodiment will explain a case wherein this relationship is reversed. That is, a case will be explained wherein an 8-bit input image is encoded, and the obtained encoded image data (baseline JPEG encoded data) is decoded to generate a 16-bit image.

Normally, in order to obtain such decoded image, an 8-bit decoded image per color component is generated first, and each color component is shifted by 8 bits to the left (to the MSB direction). However, the lower 8 bits of the generated 16-bit data are all "0"s, and the generated image data is no different from the 8-bit decoded result in terms of image quality.

Hence, the third embodiment will exemplify a case wherein 8-bit encoded data per color component (baseline JPEG data) is decoded to a 16-bit image per color component with a high precision.

Figure 6:
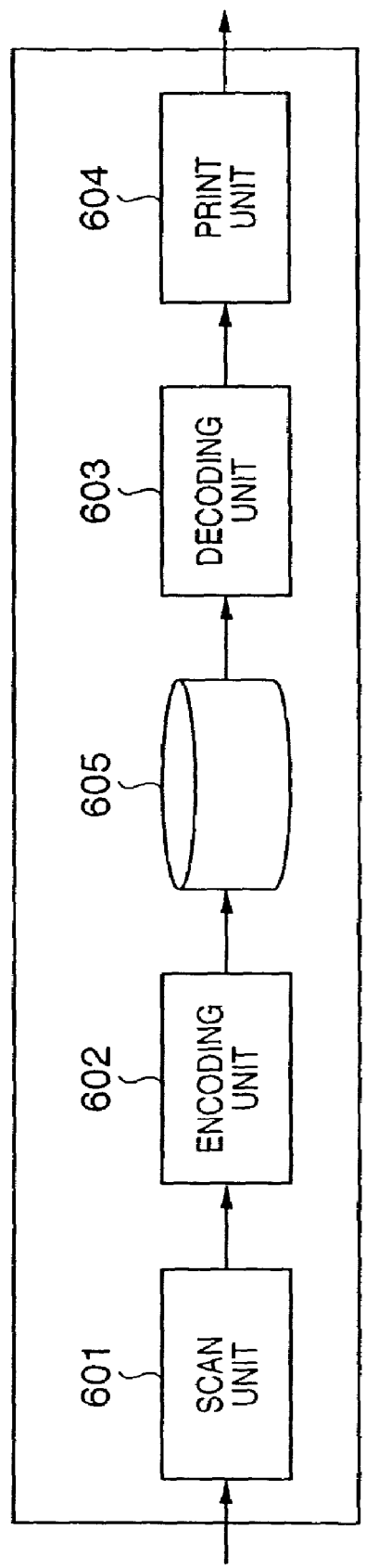
FIG. 6 is a block diagram of the overall apparatus according to the second embodiment.

FIG. 6 is a block diagram of an image processing apparatus according to the third embodiment.

Referring to FIG. 6, reference numeral 601 denotes a scan unit; 602, an encoding unit; 603, a decoding unit; 604, a print unit; and 605, a storage device. Since the functions of these units are substantially the same as those in FIG. 5, a description thereof will be omitted.

Figure 3:
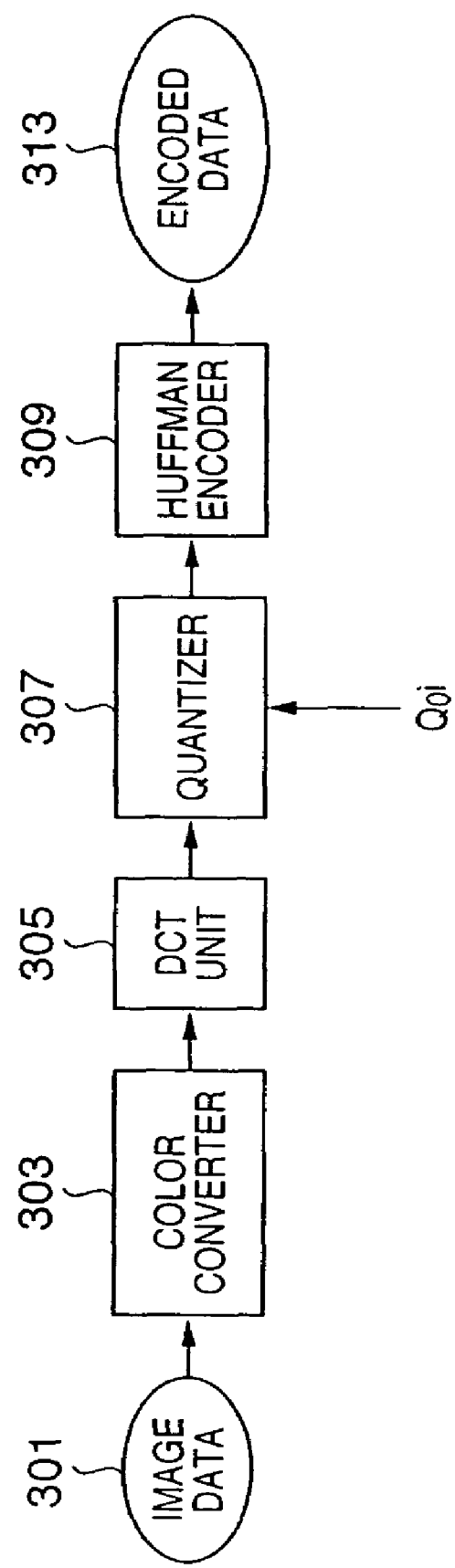
FIG. 3 is a block diagram of an encoding unit according to the third embodiment.

FIG. 3 is a block diagram of the encoding unit 602. Referring to FIG. 3, reference numeral 301 denotes input full color image data of 8 bits per color; 303, a color converter; 305, a DCT unit; 307, a quantizer; 309, a Huffman encoder; and 313, encoded data generated by an encoding process.

In the encoding unit 602, since the processing contents of processors other than the quantizer 307 are substantially the same as those in the second embodiment except that data to be processed is changed from 16 bits to 8 bits, a description of these processes will be omitted.

The quantizer 307 executes a quantization process using a quantization step value $Q_0i$ for an 8-bit image. Note that i is a serial number of DCT coefficients, and i=0, 1, ..., 63 since DCT transformation is normally made every 8×8 pixels.

The process of the encoding unit 602 in the third embodiment has been described. The decoding unit 603 will be explained below.

Figure 4:
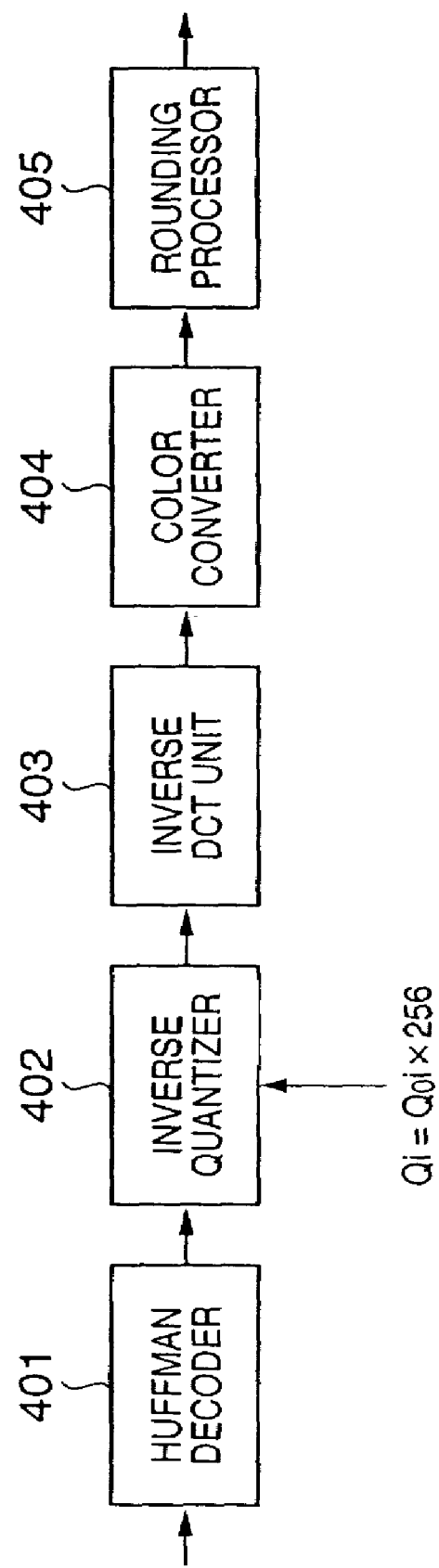
FIG. 4 is a block diagram of a decoding unit according to the third embodiment.

FIG. 4 is a block diagram of the decoding unit 603. Referring to FIG. 4, reference numeral 401 denotes a Huffman decoder; 402, an inverse quantizer; 403, an inverse DCT unit; and 404, a color converter.

Since these processors except for the inverse quantizer 402 perform substantially the same operations as those in the decoding unit 503 in the second embodiment, a description thereof will be omitted.

The inverse quantizer 402 executes inverse quantization using a quantization value Qi as a 256-fold value of the quantization step value $Q_0i$ for an 8-bit image.

With this inverse quantization, 16-bit DCT coefficients can be used. After that, the color converter 404 performs color conversion, and a rounding processor 405 executes a rounding process of fractions below the decimal points. Hence, 16-bit data which has significant bits in the lower 8 bits can be generated, and an image with high image quality can be generated.

In the description of the second and third embodiments, data to be processed by a multi-bit processing apparatus is 16-bit data. However, the present invention is not limited to these embodiments, and 9- to 15-bit data may be used.

The above embodiments have exemplified the copying machine. However, the present invention is not limited to the copying machine as long as an apparatus has an encoding unit and decoding unit. The processes associated with respective processors may be implemented by a computer program. Normally, a computer program is stored in a computer-readable storage medium such as a CD-ROM or the like, and is copied to or installed in the system after the storage medium is set in a PC. Hence, such computer-readable storage medium is included in the scope of the present invention.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-177346 filed on Jun. 15, 2004 and 2004-177348 filed on Jun. 15, 2004, which are hereby incorporated by reference herein.

What is claimed is:

1. An image decoding apparatus having a function of decoding Extended sequential DCT based JPEG encoded data, comprising:
    determination means for determining by analyzing header information of encoding data if the encoded data is baseline JPEG encoded data or Extended sequential DCT based JPEG encoded data;
    entropy decoding means for entropy decoding the encoded data;
    calculation means for, when said determination means determines that the encoded data is baseline JPEG encoded data, calculating inverse quantization data X by:

$X = D \times Q \times 2^n$ (n is an integer not less than 1 and not more than 4) where D is a decoded value decoded by said entropy decoding means, Q is a quantization step value of quantization table information included in the header information of the encoded data, and X is inverse quantization data;
    inverse DCT transformation means for performing inverse DCT transformation of the inverse quantization data X obtained by said calculation means; and
    output means for, when said determination means determines that the input encoded data is baseline JPEG encoded data, applying a rounding process to image data after the inverse DCT transformation and outputting the processed image data, and for, when said determination means determines that the input encoded data is Extended sequential DCT based JPEG encoded data, outputting image data after the inverse DCT transformation as a decoded result.

2. The apparatus according to claim 1, wherein the image data obtained by said inverse DCT transformation means is expressed by luminance and color difference components, and
    said apparatus further comprises color conversion means for converting the luminance and color difference components into color components which form a color image.

3. The apparatus according to claim 1, wherein said calculation means comprises:
    holding means for, when said determination means determines that the encoded data is baseline JPEG encoded data, holding a $2^n$ fold result of the quantization step of the quantization table information stored in the header information of the encoded data, and for, when said determination means determines that the encoded data is Extended sequential DCT based JPEG encoded data, holding the quantization step of the quantization table information stored in the header information of the encoded data intact; and
    computation means for computing the inverse quantization data by multiplying the decoded value D decoded by said entropy decoding means by the quantization step Q held by said holding means.

4. The apparatus according to claim 1, wherein said calculation means comprises:
- holding means for holding the quantization step value of the quantization table information stored in the header information of the encoded data;
- first computation means for multiplying the decoded value decoded by said entropy decoding means by the quantization step Q held by said holding means; and
- second computation means for, when said determination means determines that the encoded data is Extended sequential DCT based JPEG encoded data, outputting the computation result of said first computation means as a computation result of said calculation means, and for, when said determination means determines that the encoded data is baseline JPEG encoded data, multiplying the result obtained by said first computation means by $2^n$, and outputting that result as a computation result of said calculation means.

5. The apparatus according to claim 1, wherein said calculation means comprises:
- holding means for holding the quantization step value of the quantization table information stored in the header information of the encoded data;
- first computation means for, when said determination means determines that the encoded data is Extended sequential DCT based JPEG encoded data, outputting the quantization step value held by said holding means, and for, when said determination means determines that the encoded data is baseline JPEG encoded data, multiplying the quantization step value held by said holding means by $2^n$, and outputting that result; and
- second computation means for multiplying the decoded value decoded by said entropy decoding means by the output value of said first computation means.

6. A method of controlling an image decoding apparatus having a function of decoding Extended sequential DCT based JPEG encoded data, comprising:
- a determination step of determining by analyzing header information of encoding data if the encoded data is baseline JPEG encoded data or Extended sequential DCT based JPEG encoded data;
- an entropy decoding step of entropy decoding the encoded data;
- a calculation step of calculating, when it is determined in the determination step that the encoded data is baseline JPEG encoded data, inverse quantization data X by:

$$X = D \times Q \times 2^n$$

(n is an integer not less than 1 and not more than 4) where D is a decoded value decoded in the entropy decoding step, Q is a quantization step value of quantization table information included in the header information of the encoded data, and X is inverse quantization data;
- an inverse DCT transformation step of performing inverse DCT transformation of the inverse quantization data X obtained in the calculation step; and
- an output step of applying, when it is determined in the determination step that the input encoded data is baseline JPEG encoded data, a rounding process to image data after the inverse DCT transformation and outputting the processed image data, and outputting, when it is determined in the determination step that the input encoded data is Extended sequential DCT based JPEG encoded data, image data after the inverse DCT transformation as a decoded result.

7. An image decoding apparatus for decoding baseline JPEG encoded data to data in which each component of one pixel is expressed by n bits (n>8), comprising:
- entropy decoding means for entropy decoding encoded data;
- inverse quantization means for calculating inverse quantization data X by:

$$X = D \times Q \times 2^{n-8}$$

where D is a decoded value decoded by said entropy decoding means, Q is a quantization step value used in baseline JPEG encoding, and X is inverse quantization data;
- inverse DCT transformation means for performing inverse DCT transformation of the inverse quantization data X obtained by said inverse quantization means; and
- output means for outputting data obtained by said inverse DCT transformation means as a decoded result, wherein said output means includes:
  - conversion means for converting the data obtained by said inverse DCT transformation means into data on a color space of a predetermined image forming apparatus, and
- rounding process means for rounding respective color component data converted by said conversion means to the n bits.

8. A method of controlling an image decoding apparatus for decoding baseline JPEG encoded data to data in which each component of one pixel is expressed by n bits (n>8), comprising:
- an entropy decoding step of entropy decoding encoded data;
- an inverse quantization step of calculating inverse quantization data X by:

$$X = D \times Q \times 2^{n-8}$$

where D is a decoded value decoded in the entropy decoding step, Q is a quantization step value used in baseline JPEG encoding, and X is inverse quantization data;
- an inverse DCT transformation step of performing inverse DCT transformation of the inverse quantization data X obtained in the inverse quantization step;
- an output step of outputting data obtained in the inverse DCT transformation step as a decoded result, wherein the output step further includes:
- a conversion step of converting the data obtained in the inverse DCT transformation step into data on a color space of a predetermined image forming apparatus, and
- a rounding step of rounding respective color component data converted in the conversion step to the n bits.

* * * * *